US012427080B2

(12) United States Patent
Arnold

(10) Patent No.: US 12,427,080 B2
(45) Date of Patent: Sep. 30, 2025

(54) AMBULATION AND MOBILITY HARNESS EQUIPMENT AND METHODS

(71) Applicant: Jeanne Margaret Arnold, Bay City, MI (US)

(72) Inventor: Jeanne Margaret Arnold, Bay City, MI (US)

( * ) Notice: Subject to any disclaimer, the term of this patent is extended or adjusted under 35 U.S.C. 154(b) by 188 days.

(21) Appl. No.: 18/445,311

(22) Filed: Jun. 30, 2023

(65) Prior Publication Data

US 2024/0139057 A1 May 2, 2024

Related U.S. Application Data

(60) Provisional application No. 63/473,906, filed on Jul. 1, 2022.

(51) Int. Cl.
*A61H 3/00* (2006.01)

(52) U.S. Cl.
CPC ....... *A61H 3/008* (2013.01); *A61H 2201/163* (2013.01); *A61H 2201/1642* (2013.01); *A61H 2201/1652* (2013.01)

(58) Field of Classification Search
CPC .............. A61H 3/008; A61H 2201/163; A61H 2201/1642; A61H 2201/1652; A63B 21/0058; A63B 21/153; A63B 24/0087; A63B 21/4035; A63B 2220/20
See application file for complete search history.

(56) References Cited

U.S. PATENT DOCUMENTS

| | | | | |
|---|---|---|---|---|
| 5,115,802 | A * | 5/1992 | Dyer | A61H 1/0222 602/33 |
| 5,498,219 | A * | 3/1996 | Soufi | A47D 13/046 482/69 |
| 5,824,013 | A * | 10/1998 | Allen | A61F 5/01 606/240 |
| 6,073,280 | A * | 6/2000 | Farnum | A62B 35/0025 5/89.1 |
| 6,325,023 | B1 * | 12/2001 | Elnatan | A47D 13/046 119/770 |
| 6,656,141 | B1 * | 12/2003 | Reid | A61B 17/1325 601/134 |
| 8,147,252 | B1 * | 4/2012 | Stanford | A47D 13/046 434/255 |

(Continued)

OTHER PUBLICATIONS

Arnold, U.S. Appl. No. 61/632,886 entitled, "Progressive Mobility Assistance Garment for Rehabilitation," filed Feb. 1, 2012 A.D.

(Continued)

*Primary Examiner* — Sundhara M Ganesan
(74) *Attorney, Agent, or Firm* — Christopher John Rudy

(57) ABSTRACT

An ambulation harness for patients of size includes first and second patient slings in combination. The slings have generally flexible, laterally extending pelvic belt bodies, with side border fastening system(s) to secure corresponding opposite side borders of the slings in conjunction or registry for girding about the pelvis area of the patient; suspension strap(s); and depending leg strap(s) terminating in leg strap fastener system(s) to secure the leg strap(s) to the pelvic belt bodies. A walled, elongate, double open ended tube made with a reduced friction sheet material may encircle a strap of a sling or harness. A resilient cushioning tube may underlie the reduced friction tube.

20 Claims, 7 Drawing Sheets

(56) References Cited

U.S. PATENT DOCUMENTS

| | | | | |
|---|---|---|---|---|
| 8,321,972 | B1 * | 12/2012 | Vetter | A61G 7/1023 5/81.1 R |
| 9,420,832 | B2 | 8/2016 | Arnold | |
| 11,077,004 | B2 * | 8/2021 | Arnold | A61G 7/1013 |
| 11,077,044 | B2 | 8/2021 | Arnold | |
| 11,691,038 | B2 * | 7/2023 | Lucas | A61H 1/0229 182/3 |
| 2002/0032103 | A1 * | 3/2002 | Cook | A63B 21/4011 482/23 |
| 2003/0162636 | A1 * | 8/2003 | West | A61H 3/008 482/69 |
| 2003/0195445 | A1 * | 10/2003 | Behan | A61F 5/0102 602/19 |
| 2004/0230150 | A1 * | 11/2004 | West | A61H 3/008 602/19 |
| 2005/0204470 | A1 * | 9/2005 | Main | B66C 1/18 5/81.1 R |
| 2013/0205466 | A1 * | 8/2013 | Arnold | A41D 1/00 2/69 |
| 2015/0136145 | A1 * | 5/2015 | Binder | A61G 7/1023 128/845 |
| 2016/0015584 | A1 | 1/2016 | Choudhury et al. | |
| 2020/0046588 | A1 * | 2/2020 | Arnold | A61G 7/1023 |
| 2020/0253809 | A1 * | 8/2020 | Behrman | A61H 3/008 |
| 2024/0398644 | A1 * | 12/2024 | Lin | A61G 5/0875 |

OTHER PUBLICATIONS

Arnold, U.S. Appl. No. 62/764,579 entitled, “Patient Mobility Garment for Nurses,” filed Aug. 8, 2018 A.D.

Arnold, U.S. Appl. No. 63/473,906 entitled, “Ambulation Harness Equipment and Methods,” filed Jul. 1, 2022 A.D.

* cited by examiner

AMBULATION AND MOBILITY HARNESS EQUIPMENT AND METHODS

This claims all available benefits under 35 USC 119(e) of provisional patent application No. U.S. 63/473,906 filed on Jul. 1, 2022 A. D. The specification of that application, to include its drawings, is incorporated herein by reference in its entirety.

FIELD AND PURVIEW OF THE INVENTION

Of concern is ambulation and mobility harness equipment and methods of making and using the same. The present harness, made for people of size, to include some bariatric patients, can be made, for example, by combining two patient mobility garments for nurses such as disclosed in U.S. Pat. No. 11,077,004 B2. Also of concern is a walled, double open ended elongate tube, made with a reduced friction sheet material that can encircle a strap of a patient mobility garment, for example, leg straps of a sling or harness, including the present ambulation and mobility harness. A resilient foam cushioning tube may underlie the reduced friction tube and provide further padding.

BACKGROUND TO THE INVENTION

U.S. Pat. Nos. 9,420,832 B2 and 11,077,004 B2, both to Jeanne Margaret Arnold, respectively disclose a progressive mobility assistance garment for rehabilitation, and a patient mobility garment for nurses. As valuable as those inventions are, they have their limitations.

One of the problems or challenges with harnesses or slings for people of size, to include those who are bariatric, i.e., those weighing some 600-800 pounds, and those approaching bariatric level, is finding and fitting such a person with a suitable harness or sling. An unusually large specialty harness or sling may be procured and employed, but this can be not only very expensive but also not often used. A second problem or challenge with harnesses or slings for people of size is that the straps, which are made with webbing and fitted between their legs, are difficult to emplace and get stuck on their thighs. A third problem or challenge is that people of such size often have fragile skin, which tears easily and puts them at risk for skin injury from tearing and from friction with the strap webbing. A fourth problem or challenge is that the weight distribution through leg straps can also cause a high level of discomfort to the patient.

DESIDERATA

It would be desirable to ameliorate, or solve substantially if not completely, at least one of such problems or others in the art. It would be desirable to provide an economically efficient amelioration or solution to such problem(s), especially a provision that may be used effectively in a wider range of patient sizes. It would be desirable to provide the art an alternative.

A SUMMARY OF THE INVENTION

In address of the first challenge and to a certain extent other challenge(s) noted above, provided hereby is an ambulation and mobility harness for a patient comprising, comprising essentially, consisting essentially of, or consisting of, in combination, a first patient sling and a second patient sling, each of said first and second patient slings comprising, comprising essentially, consisting essentially of, or consisting of, a generally flexible, laterally extending pelvic belt body having upper, lower, and opposite side borders, and in conjunction therewith, the following:

at least one side border fastener system with respect to the first and/or second sling(s) in combination, configured to secure corresponding opposite side borders of the first and second slings in conjunction or registry such that the pelvic belt bodies of the first and second patient slings can be girded about the pelvis area of the patient and fixed with respect to a horizontal orientation;

at least one suspension strap (shoulder strap(s)) with respect to the first and/or second sling(s) in combination; and at least one depending leg strap with respect to the first and/or second sling(s) in combination, terminating in leg strap fastener system(s) configured to secure the leg strap(s) of the first and/or second sling(s) respectively to the pelvic belt body(ies) of the second and/or first patient sling(s).

For example, the ambulation and mobility harness can comprise, comprise essentially, consist essentially of, or consist of, in combination, as the first patient sling, a first patient mobility garment for nurses, and, as the second patient sling, a second patient mobility garment for nurses, each of said first and second patient mobility garments for nurses comprising, comprising essentially, consisting essentially of, or consisting of, a flexible, laterally extending pelvic belt body having upper, lower, and opposite side borders, and in conjunction therewith, the following:

optionally, a plurality of spaced apart structural reinforcement members (ribs) placed in generally vertical directions that substantially approach or span the upper and lower borders; a plurality of loops vertically positioned with respect to one another about the ribs;

a plurality of flexible, adjustable length girding straps horizontally oriented with respect to the pelvic belt body and configured to gird the pelvic belt body about the pelvis area of the patient and bring the opposite side borders into conjunction or registry, each girding strap having a girding strap attaching member for fixation thereof;

a plurality of flexible, typically adjustable length suspension straps (shoulder straps); and a plurality of flexible, depending leg straps terminating in a fastening contrivance for engaging at least one of the vertically positioned loops;

wherein the first patient mobility garment for nurses is connected to the second patient mobility garment for nurses, as follows:

by connection of at least two of the terminating fastening contrivances of at least two of the plurality of flexible depending leg straps of the first patient mobility garment for nurses to at least two of the vertically positioned loops of the second patient mobility garment to provide a first ambulation harness leg strap, and by connection of at least two of the terminating fastening contrivances of at least two of the plurality of flexible depending leg straps of the second patient mobility garment for nurses to at least two of the vertically positioned loops of the first patient mobility garment to provide a second ambulation harness leg strap; and by connection of at least one of the plurality of flexible, adjustable length girding straps of the first patient mobility garment for nurses by at least part of its girding strap attaching member to at least one of the plurality of flexible, adjustable length girding straps of the second patient mobility garment for nurses by at least part of its corresponding girding strap attaching member, and by connection of at least one of the plurality of flexible, adjustable length girding straps of the second patient mobility garment for nurses by at least part of its girding strap attaching member to at least one of the plurality of flexible, adjustable length girding straps of the first patient mobility garment for nurses by at least part of its corresponding girding strap attaching member.

In special address of the second, third and fourth challenges above, provided hereby is a walled, preferably plural walled, say, a double walled, elongate tube that is double open ended, and made with a reduced friction sheet material. Such a tube beneficially encircles each leg strap of a sling or harness, including the present ambulation harness, or another strap or suitable feature, for example, a shoulder strap. A resilient cushioning tube may underlie the reduced friction tube.

The invention is useful in helping with patient mobility and rehabilitation.

Significantly, by the invention, the art is advanced in kind, and is provided an alternative. At least one of the aforementioned problems is ameliorated if not substantially or completely solved. More particularly, provided is an economically efficient amelioration or solution to one or more of such problems, especially a provision that may be used effectively in a wider range of patient sizes. For example, two MobilityCoachPRO™ (MCR™) nursing units, commercial embodiments of the '004 patent to Arnold, can be connected together to lift and mobilize a patient weighing up to seven hundred pounds. This is innovative and highly advantageous because facilities can use the equipment they already have, and just connect together the slings or mobility garments they use for smaller sized people rather than purchasing specialty slings or mobility garments for larger sized people. The friction-reducing tube device makes it easy to slide such equipment under and between the thighs and thus easier to put it in place for better fitting and to remove it more comfortably for the patient and efficiently for the caregiver, and helps to reduce if not avoid the risk of tearing fragile skin or rubbing it raw from friction with strap webbing. Also, the cushioning tube further assists in the effort to protect and provide further padding for a patient, to include to relieve pain and discomfort from bearing body weight through the straps, if the patient needs support, during mobility, which, of course, may include ambulation. Such tube(s) may be mounted on a strap of any suitable garment for assisting in patient mobility. The invention simple to use, thus a boon to nursing staff and hence their patients, and is efficient to make. Numerous further advantages attend the invention.

DRAWINGS

The drawings form part of the specification hereof. With respect to the drawings, which are not necessarily drawn to scale, the following is briefly noted:

FIG. 1 is a view of two generally expanded patient mobility garments for nurses as from U.S. Pat. No. 11,077,004 B2, laid out to ready them for combination into the present ambulation harness, in which the sides facing away from the patient when the ambulation harness is worn are depicted.

FIG. 2 shows a plural walled, double open ended elongate tube—for example, formed in a tube shape either by way of design and manufacture into its shape without a sheet intermediate or by forming a sheet into a tube, say, by hot melting, adhesives or taping—that is made with a waterproof, reduced friction sheet material, being formed from a single walled tube. A resilient foam cushioning tube underlies an inner layer of a lower part of the reduced friction tube.

FIG. 3 shows initial insertion of a depending leg strap, shown as having a sliding leg pad but which in practice may or may not have such a pad, into the underlying resilient foam cushioning tube encircled by the plural walled, reduced friction tube of FIG. 2 in which the top part of the plural walled, double open ended elongate tube was folded down outside the inner layer of the lower part of the reduced friction tube to form an outer layer to the plural walled, double open ended elongate tube, so as to provide a tube-in-tube construction.

FIG. 4 shows further insertion to that shown in FIG. 3, with pulling through of the depending leg strap by its terminating fastening contrivance, for example, a carabiner clip.

FIG. 5 shows layout and further assembly of components as from FIGS. 1-4 into an ambulation harness as hereof, inner face up, with the depending leg strap of the first patient mobility garment encircled by a walled, here, double walled, double open ended elongate tube hereof, made with the waterproof, reduced friction sheet material, installed and encircling the leg strap, and with a resilient foam cushioning tube encircling that strap and underlying the reduced friction tube. The depending leg strap of the second patient mobility garment is being readied for insertion through the resilient foam cushioning tube and double walled, double open ended elongate, low friction material tube, led by its terminating fastening contrivance end, here, a carabiner containing end.

Figure 1:
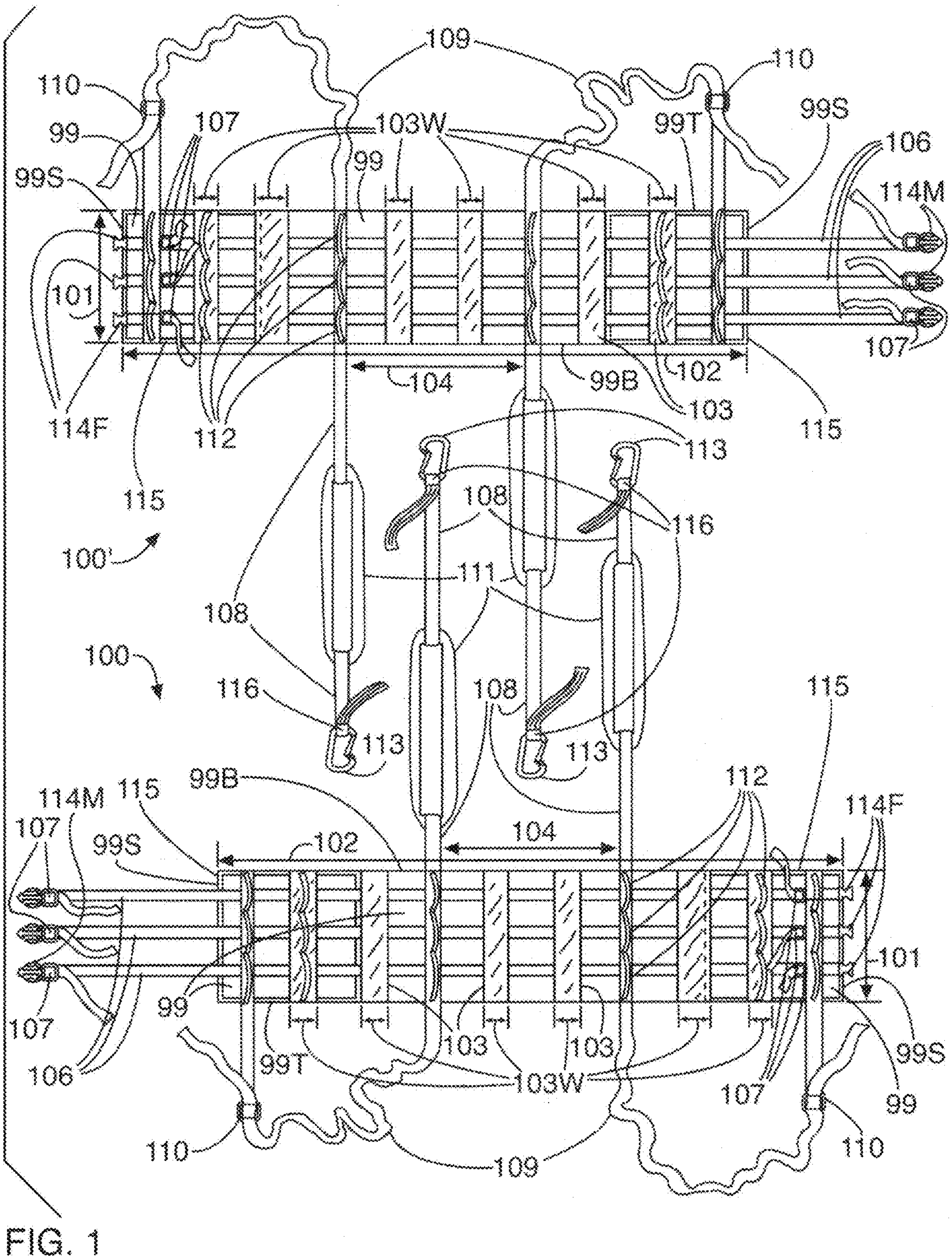
Figure 2:
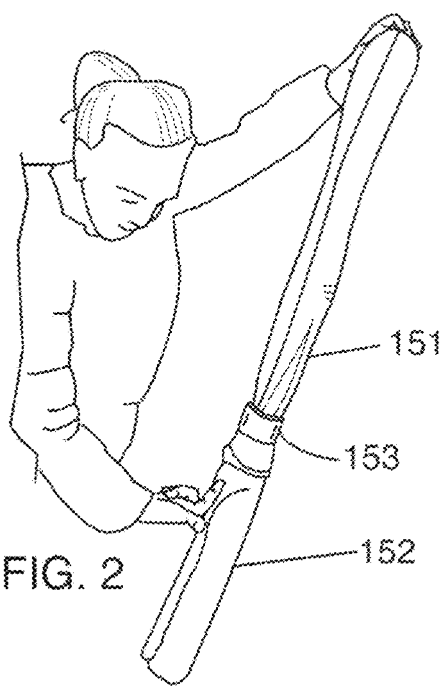
Figure 3:
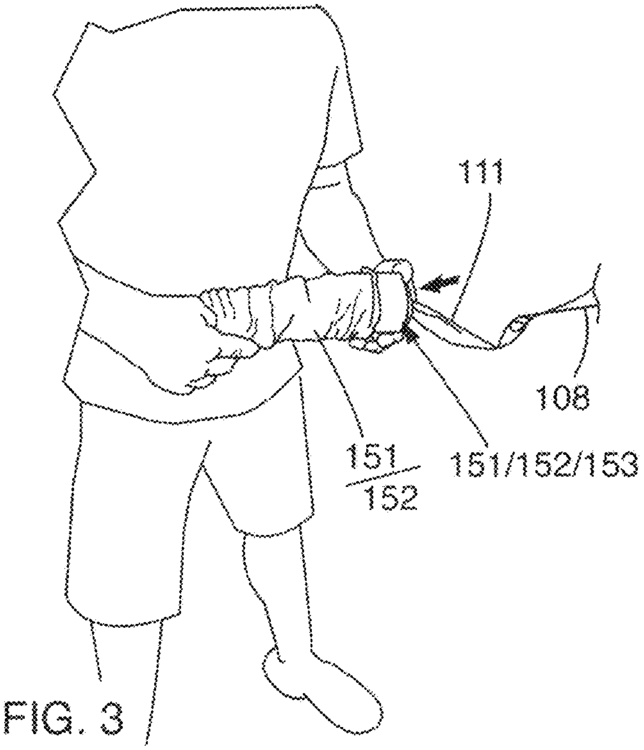
Figure 4:
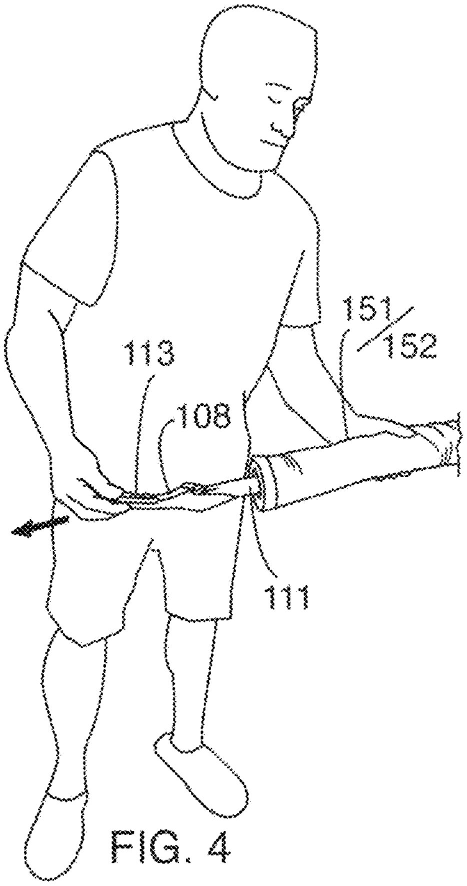
Figure 5:
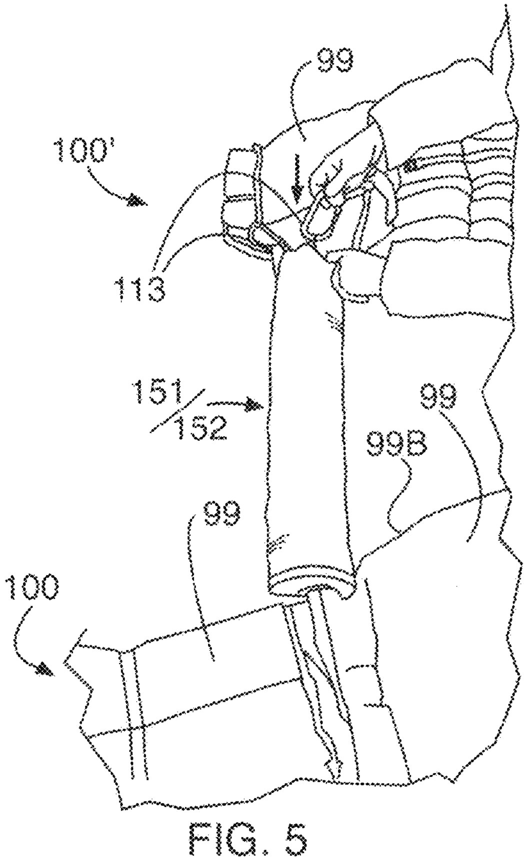
Figure 6:
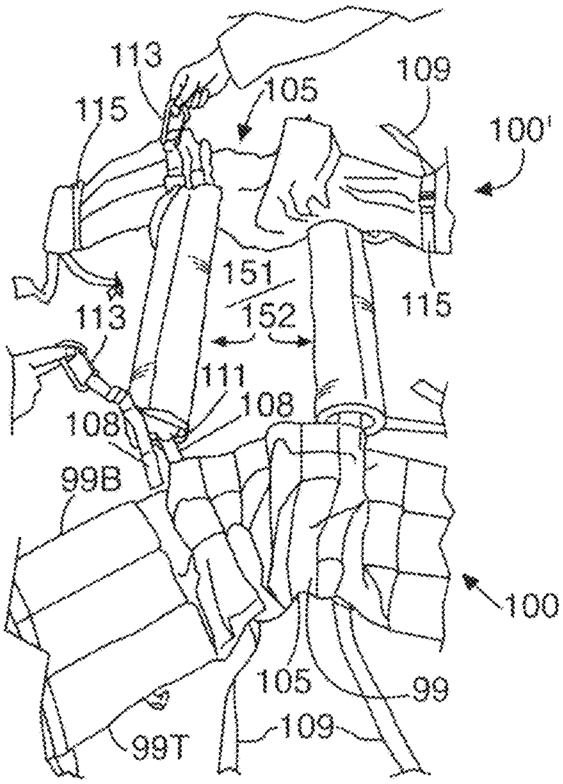
FIG. 6 shows the depending leg strap of the second patient mobility garment found in FIG. 5 threaded through the cushioning tube and low friction material tube subassembly.
Figure 7:
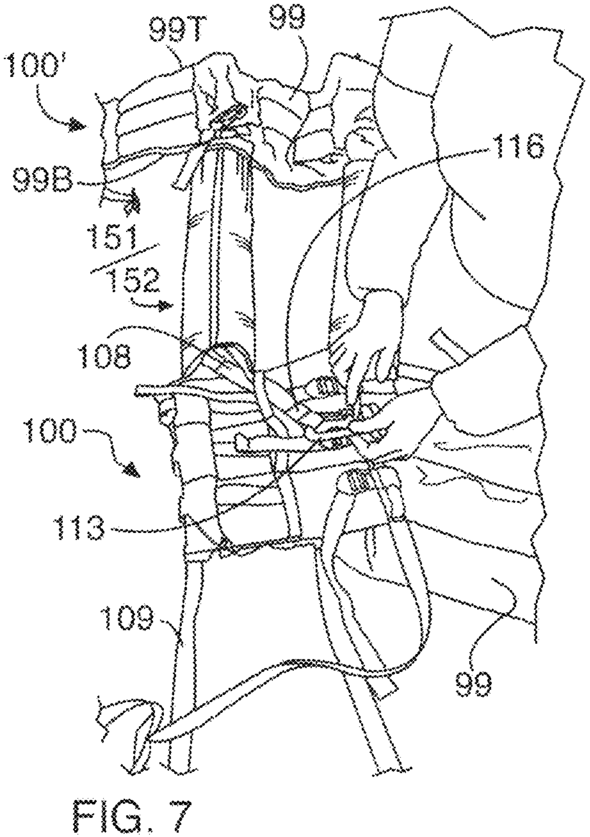
FIG. 7 shows attachment of the threaded through depending strap of the second patient mobility garment in FIG. 6 to a loop on the outside portion of the first patient mobility garment.
Figure 8:
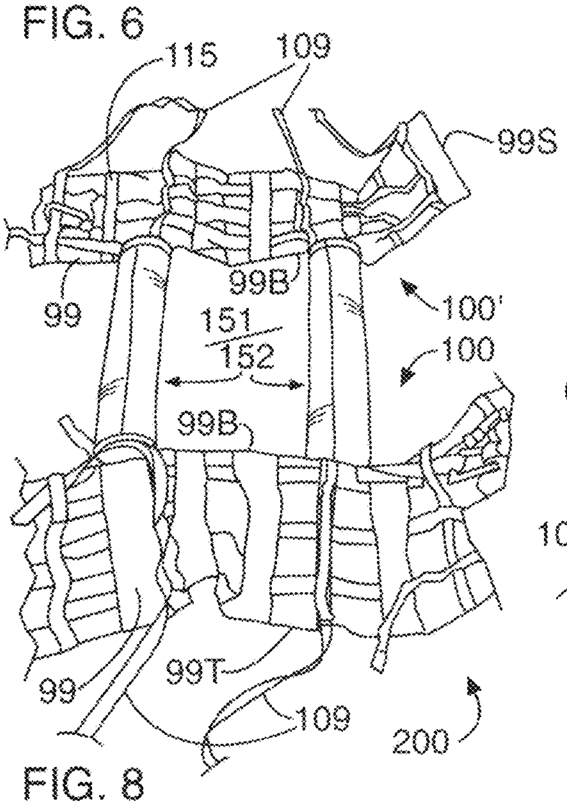
FIG. 8 shows the ambulation harness of FIG. 2, assembled per FIGS. 5-7, outer face up.
Figure 9:
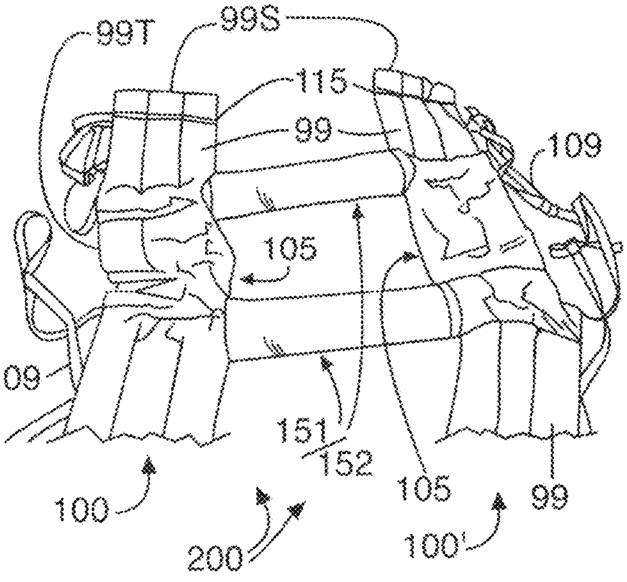
FIG. 9 shows the ambulation harness of FIG. 2, assembled per FIGS. 5-7, inner face up.
Figure 10:
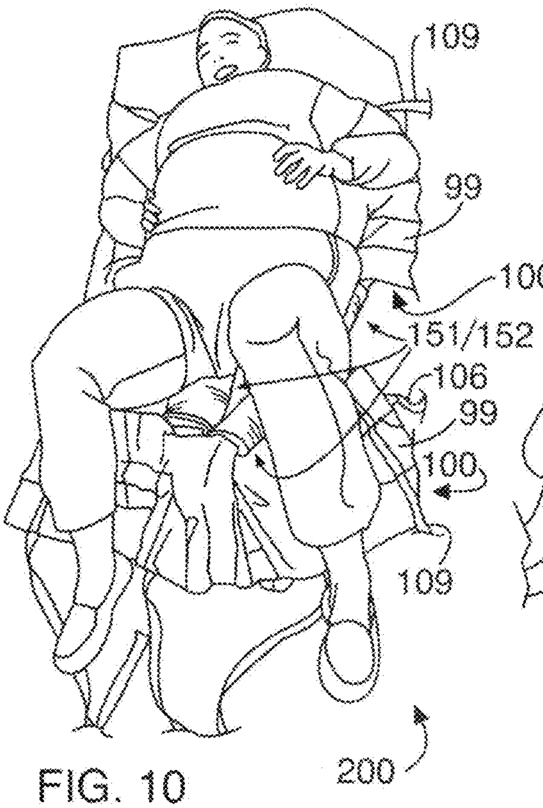
FIG. 10 shows a patient in bed beginning to get ready to wear the ambulation harness of FIGS. 2-9 so as to be ready to be assisted with a lift from the bed.
Figure 11:
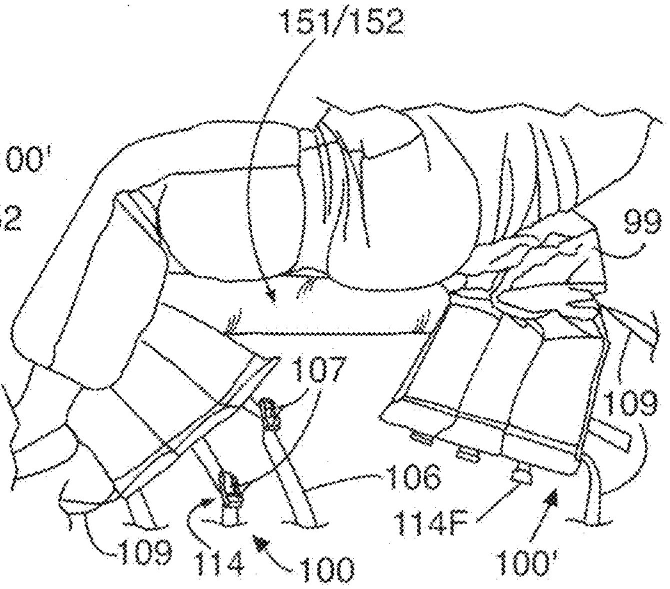
FIG. 11 shows the patient further readied to wear the ambulation harness in FIG. 10.
Figure 12:
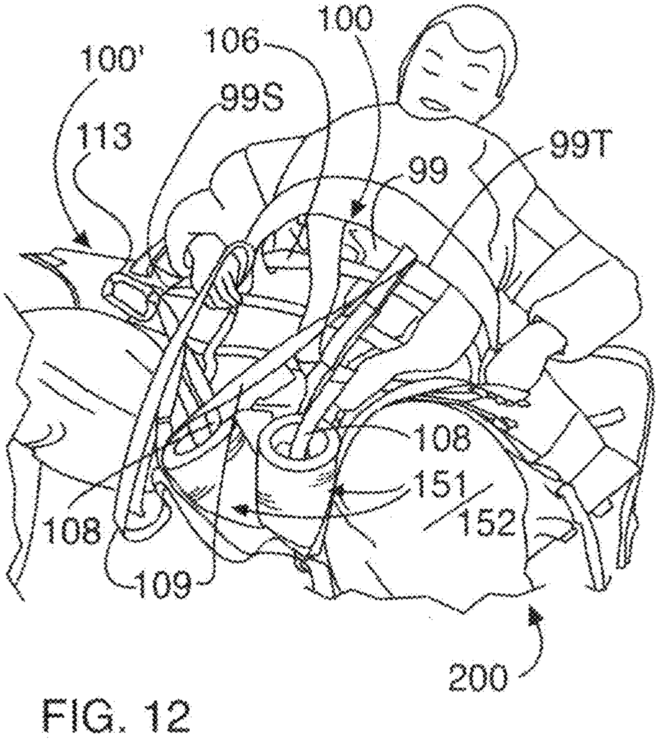
FIG. 12 shows the patient further readied to wear the ambulation harness in FIG. 11, with the first patient mobility garment, previously furthest from the patient's head, fed between the patient's legs toward the torso in front, readying to connect girding straps of the first patient mobility garment to those of the second patient mobility garment upon which the patient lies.
Figure 13:
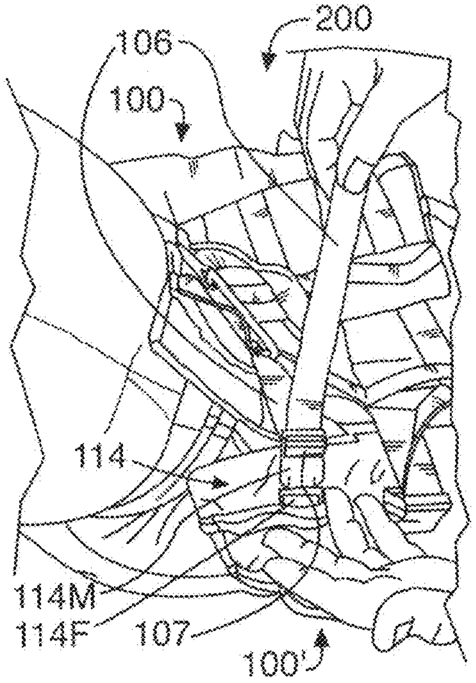
FIG. 13 shows the patient wearing the ambulation harness in FIG. 12, for whom a fastened, adjustable length girding strap now spanning the first and second patient mobility garments is being adjusted, with the male insertion portions of the girding strap parachute buckles of one patient mobility garment inserted in the female receptacle portions of the other.
Figure 14:
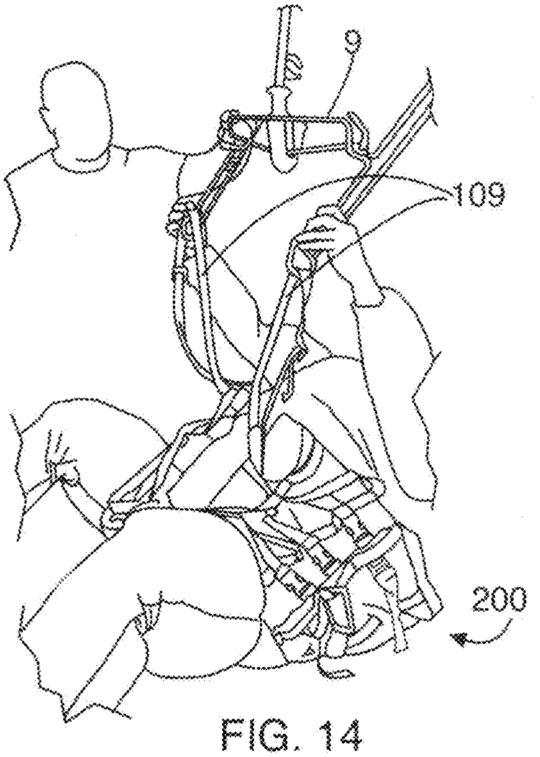
FIG. 14 shows readying the patient wearing the ambulation harness in FIG. 13 for attachment to a lift via the shoulder straps.
Figure 15:
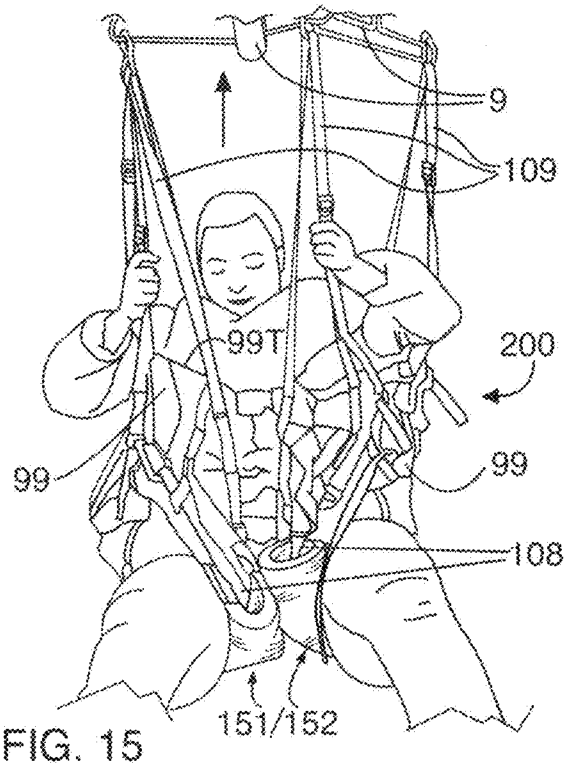
FIG. 15 shows the patient wearing the ambulation harness in FIG. 14, attached to the lift via the shoulder straps being lifted.
Figure 16:
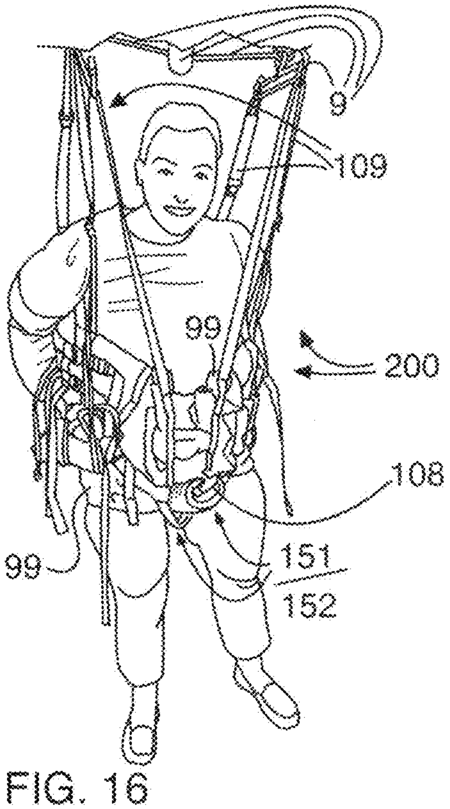
FIG. 16 shows the patient wearing the ambulation harness in FIG. 15, lifted and standing with help from the ambulation harness.
Figure 17:
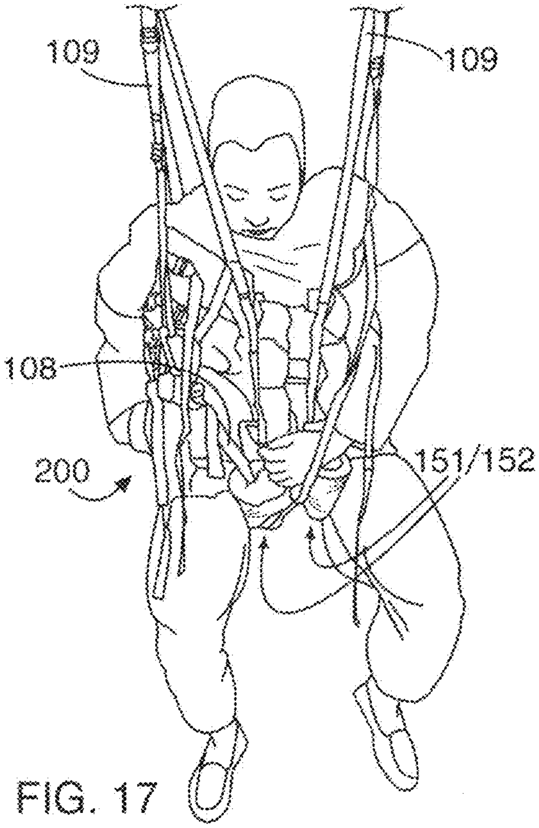
FIG. 17 shows the patient wearing the ambulation harness in FIG. 16, sitting after loss of ambulation.
Figure 18:
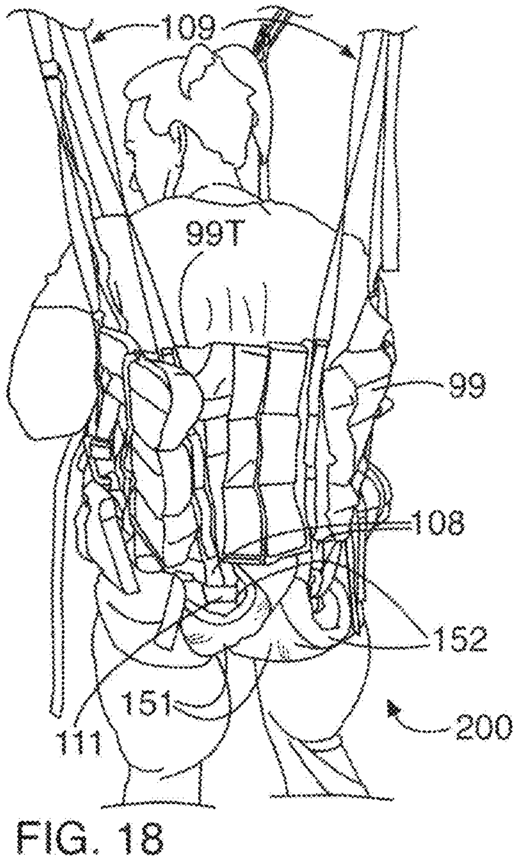
FIG. 18 shows a rear view of the patient wearing the ambulation harness in FIG. 17, supported in a standing position.
Figure 19:
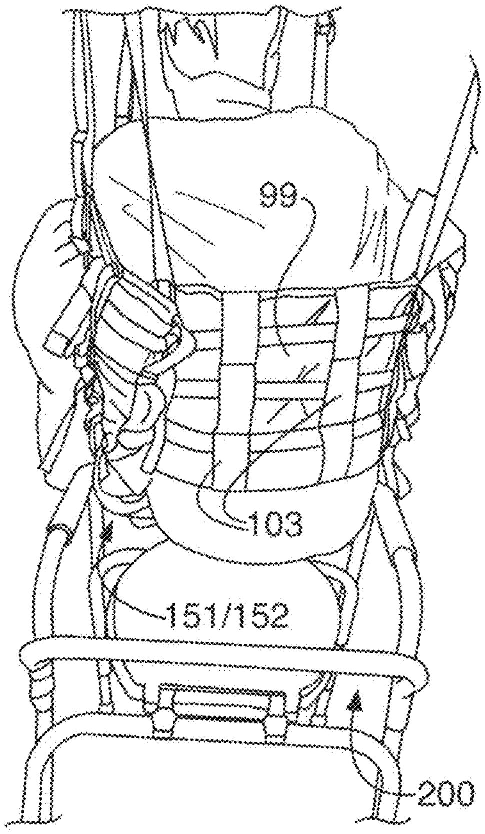
Figure 20:
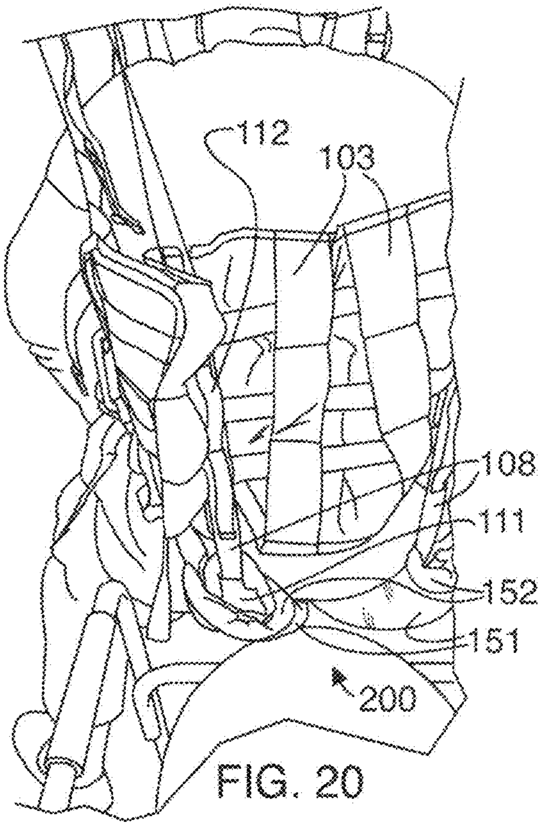

FIG. 19 shows a rear view of the patient supported in the ambulation harness in FIG. 18 with the leg straps apart, lowered over a toilet to simulate use thereof. This demonstrates the adjustability of the leg straps to move away from the perineum during toileting, so that this invention allow a patient to void their bowel or bladder while still supported by the harness FIG. 20 shows a rear view of the patient supported in the ambulation harness in FIG. 19 with the leg straps closer together, being lifted from the toilet after simulated use thereof. This demonstrates the contrast of the wider placement for voiding, in which ease is afforded by the friction reducing double-walled elongate tube and the narrower placement in readiness for lifting. The waterproof nature of the elongate friction-reducing tube affords protection of the leg straps from splashes and soiling during toileting. The low cost of the tubes allows them to be single patient use and discarded after using for toileting to be replaced with new ones.

Figure 21:
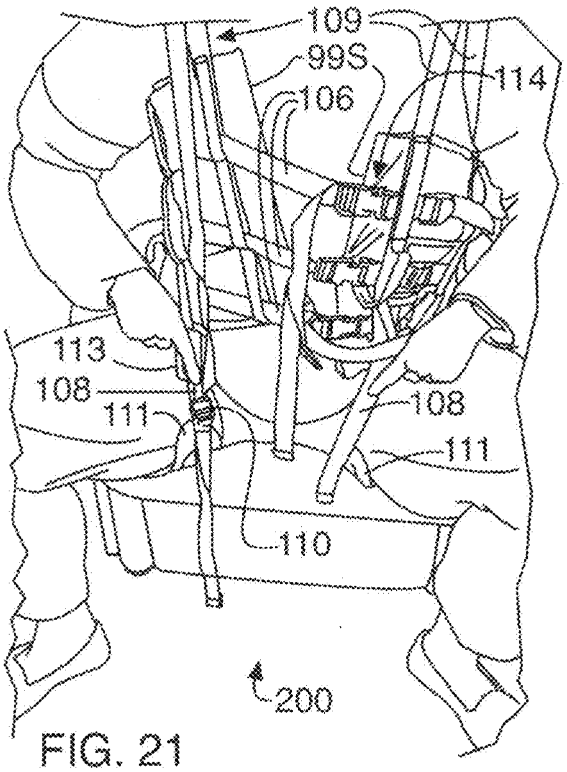

FIG. 21 shows a front view of a patient wearing the ambulation harness of FIGS. 2-9 but without a plural walled, double open ended elongate tube made with waterproof, reduced friction sheet material over a resilient foam cushioning tube, sitting and pointing to uncovered leg straps across bare skin.

Figure 22:
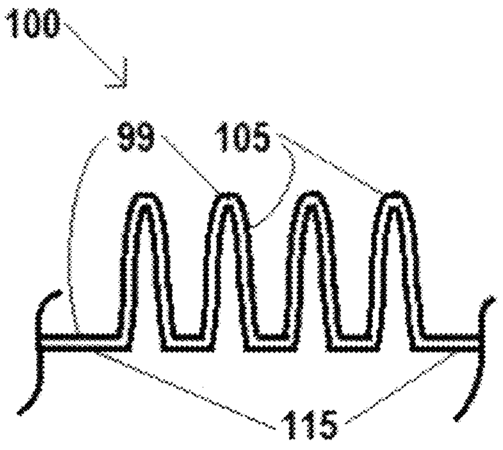

FIG. 22 is a top view of a pelvic belt body of a patient mobility garment for nurses for an ambulation harness hereof, shown in a contracted state with collapsible folds of flexible material, but with straps, fasteners and so forth not illustrated.

Figure 23:
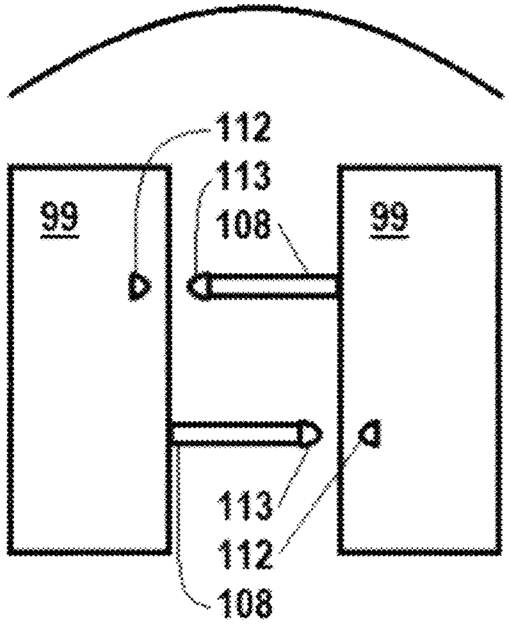

FIG. 23 is an elevational view of two alternative patient slings arranged for assembly into an ambulation harness hereof.

Figure 24:
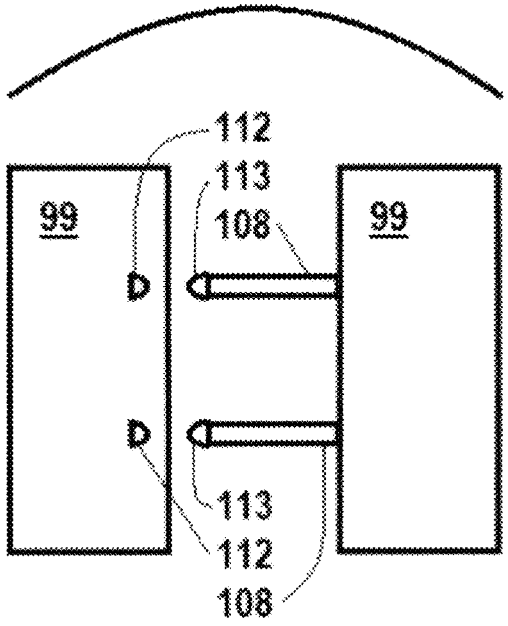

FIG. 24 is an elevational view of two other alternative patient slings arranged for assembly into an ambulation harness hereof.

FURTHER ILLUSTRATIVE DETAIL

The invention can be further understood by the detail set forth below. As with the foregoing, the following can be read in view of the drawings and, unless indicated otherwise, is to be taken in an illustrative, but not necessarily limiting, sense:

In general, two patient mobility garments for nurses such as disclosed by the '004 patent to Arnold can be combined to make one ambulation harness hereof. Thereby, terminating ends of the two depending leg straps of one patient mobility garment, say, a first, of the pair of patient mobility garments are fastened to suitable portions of the other, say, a second, of the pair of patient mobility garments, for example, to loops on the second garments's flexible, laterally extending pelvic belt body; and the terminating ends of the two depending leg straps of the second patient mobility garment are fastened to suitable portions of the first patient mobility garment, for example, to loops on the first garment's laterally extending pelvic belt body. Beneficially, any sliding leg pads of the patient mobility garments are retained to help combat abrasion and/or friction injuries and keep patient skin integrity more intact.

Advantageously, such attachment of the two patient mobility garments occurs following threading of each of the two pairs of straps through a walled, preferably a double walled, double open ended elongate tube, made with a waterproof, reduced friction, sheet material, which beneficially encircles each pair of the depending leg straps that would make up the present ambulation harness combination. Individual cushioning tubes, for example, made with a resilient foam, advantageously underlie each reduced friction tube, which may further and significantly help combat skin injury. Such individual reduced friction and/or foam cushioning tube(s), however, may not be present, for example, should a depending leg strap be made with cushioning and/or anti-friction material(s), should the patient be wearing cushioning clothing, should a care provider determine that such a tube is not necessary or desirable in a particular instance, or for another reason.

A single patient mobility garment for nurses as found in the '004 patent may be combined with a lift garment that does not have all features necessary to make up such a patient mobility garment, or with a lift garment that has more of such features, to provide an ambulation harness hereof. As well, a pair of such lift garments not having all or having more than enough features of such a patient mobility garment may be combined to make an ambulation harness hereof.

Any suitable material(s) may be employed. Thus, materials found in the '004 and/or '832 patents may be employed. In general, materials should be strong, relatively flexible, comfortable where needed, and easy to clean and store or to dispose. For example, pelvic belts and various straps may be made with suitably strong flexible fabric, leather, plastic, paper and so forth material(s), say, a strong, flexible fabric such as polypropylene or nylon, which may be webbed. Reinforcement may be provided. Buckles, clips, ties and so forth may be made with suitable metal(s), plastic(s), wood(s) and so forth. A material may have a 1200-pound or greater strength.

Material(s) for the reduced friction, walled, double open ended elongate tube, are made with a reduced friction sheet material such as a low friction, low shear plastic, say, of a nylon or a polyurethane, infused and/or coated with a silicone or other silicon containing compound or composition to make it more "slippery" when placed in contact with itself, bedclothes, personal clothing, skin of a patient, and so forth. In general, the sheet material is thin, for instance, having an about 2-mm thickness or less, which may form a tube with an about from 10-inch to 16-inch circumference, and an about from 40-inch to 60-inch length when not folded on itself to make a plural walled, say, double walled, elongate tube. Such a tube may be made by adhesive and/or heat-weld attachment of a cut sheet section, or by extrusion into a suitable tube shape and size, and then cutting it to appropriate length(s). The reduced friction capability of this tube is such that it permits and eases positioning of leg portions of the ambulation harness in particular, while benefitting the patient through reduction in friction on his skin. Advantageously, the reduced friction sheet material is waterproof and washable or better still, disposable for the sake of health reasons and easily and economically replaceable. Such material may be commercially available, for example, as that which is otherwise employed to make slide sheets in the safe patient handling world, or friction reducing sheets and materials used in industries other than healthcare.

Material(s) for the resilient cushioning tubes, for instance, of foam, that may underlie reduced friction tubes include durable, resilient insulating foam tubes made from suitable plastics or resins. In general, the resilient foam cushioning tube is thick enough to provide cushioning for the patient, for instance, about from ⅜-inch to ¾-inch thick, say, about ½ of an inch thick, which may form a tube with an about from a 3-inch to a 6-inch inside diameter, say, about from 3½ to 4½ or 5½ inches in inside diameter, for example, about 3½ or 4½ inches in inside diameter, and an about 20-inch to 30-inch length. Beneficially, the resilient foam cushioning tube material is waterproof and washable or otherwise disposable. Washability of the resilient foam cushioning tube is enhanced by providing the tube with a closed cell structure, particularly with respect to its or inner and outer surfaces, or otherwise by providing it with a nonporous surface. Such material may be commercially available, for instance, as pipe or tube insulation material manufactured by Armacell as Armaflex® elastomeric closed cell pipe insulation tubing with Microban® microbial protection and available from Armacell as well as from other sources to include KegWorks.

Ambulation and mobility harness 200, which can include two patient mobility garments for nurses, a first 100 and a second 100', in combination, and methods to make the same, and to use the same, for instance, with lift 9, may be embodied as described herein and depicted in the drawings. As an illustrative example, possible foundational components hereof are noted without excluding other items or methods that may or may not be depicted, some of which are found or generally have counterparts such as disclosed in U.S. Pat. Nos. 9,420,832 B2 and/or 11,077,004 B2, notably the latter, as follows:

| Numeral | Comment |
|---|---|
| 99 | Pelvic belt body |
| 99B | Bottom (lower) border of pelvic belt body |
| 99S | Side (lateral) borders of pelvic belt body |
| 99T | Top (upper) border of pelvic body |
| 101 | Depth (height) of pelvic belt body, for example, about 10-inch to 12-inch height, say, an 11-inch height, to accommodate torso size |
| 102 | Expandible/contractable width (girth) of a pelvic belt body, for example, two exemplary patient mobility garments, each having an about 22-inch or 24-inch width pelvic belt body at full collapse and an about 54-inch width pelvic belt body at full expansion, combined to make an ambulation and mobility harness hereof with an about from a 44-inch, 46-inch or 48-inch to a 76-inch, 78-inch or 108-inch girth, or even greater when considering employment of adjustable length girding straps |
| 103 | Spaced apart vertical webbing ribs, which help maintain form in the pelvic belt body from an expanded to a collapsed state, and facilitate proper placement of leg straps in patients of different size/girth/body mass distribution |
| 103W | Width of spaced apart vertical webbing ribs, for example, an about 2-inch width except for one having a 3-inch width to house a label of the harness |
| 104 | Maximum and minimum distances between leg straps in a pelvic belt body, for example, an about from 4-inch to 16-inch distance |
| 105 | Collapsible folds of flexible material, which assist in expansion and collapse of a pelvic belt body, with such folds possibly appearing when an ambulation and mobility harness hereof is engirded about a patient at less than its maximum girth |
| 106 | Adustable length circumferential girding straps, for example, about 68-inch lengths at their longest, to allow for a roughly 65-inch effective length with a 3-inch tail on the straps, and with any suitable number of these straps, say, three, of which one to three, again, say, three, depending on the situation, may be fastened to corresponding strap(s) on a second patient mobility garment for nurses to form an ambulation harness hereof |
| 107 | Length adjuster mechanism for an adjustable length circumferential girding strap, for example, with each girding strap having a dual length adjuster mechanism |
| 108 | Adjustable length leg straps, imperative for fall prevention, each of which able to be a continuous strap from a corresponding shoulder strap, through the pelvic belt body, and to the leg strap |
| 109 | Adjustable length shoulder straps, especially to assist in lifting and maintaining control during standing and ambulation |
| 110 | Adjustable buckle mechanism for an adjustable length shoulder strap |
| 111 | Sliding leg pads |
| 112 | Vertical webbing loops, which can be attached to the spaced apart vertical webbing ribs to provide anchor placements such as for clips, for example, carabiner clips, on adjustable length leg straps, say, one clip per adjustable length leg strap that is attached to one vertical webbing loop, with multiple vertical webbing loops on the pelvic belt body to allow a caregiver to adjust the fit of the adjustable length leg straps in the present ambulation and mobility harness, and with these loops being long enough, for example, with about from 3-inch to 4-inch lengths, to allow the caregiver to place his finger(s) through to aid in cuing the patient during ambulation, other mobility actions or standing |
| 113 | Leg strap fasteners, for example, carabiner clips, each having a 1200-pound tensile strength rating |
| 114 | Girding strap attaching contrivances for connecting the adjustable length circumferantial girding straps, for example, parachute buckles |

-continued

| Numeral | Comment |
|---|---|
| 114F | Female receptacle portion of a parachute buckle |
| 114M | Male insertion portion of the parachute buckle |
| 115 | Generally non-folding portion of a pelvic belt body such as provided by stiffer, thicker and/or reinforced material |
| 116 | Adjustable buckle mechanism for a leg strap |
| 151 | Walled, double open ended, reduced friction, elongate tube |
| 152 | Resilient cushioning tube |
| 153 | Fastener, e.g., elastic band or tape, to fix a walled, double open ended, reduced friction tube to a resilient cushioning tube. |

FURTHER INCORPORATIONS BY REFERENCE

In addition to the aforementioned specification including drawings of the domestic priority document, provisional patent application No. U.S. 63/473,906 filed on Jul. 1, 2022, the specifications including drawings of U.S. Pat. Nos. 9,420,832 B2 and 11,077,004 B2, to include the specifications including drawings of their respective domestic priority documents, provisional patent application Nos. U.S. 61/632,886 filed on Feb. 1, 2012 and U.S. 62/764,579 filed on Aug. 8, 2018, are incorporated by reference herein in their entireties.

CONCLUSION TO THE INVENTION

The present invention is thus provided. Various feature(s), part(s), step(s), subcombination(s) and/or combination(s) can be employed with or without reference to, or order of, other feature(s), part(s), step(s), subcombination(s) and/or combination(s) in the practice of the invention, and numerous and sundry adaptations and modifications can be effected within its spirit, the literal claim scope of which is particularly pointed out by the following claims:

I claim:

1. An ambulation and mobility harness for a patient comprising, in combination, a first patient sling and a second patient sling, each of said first and second patient slings comprising a generally flexible, laterally extending pelvic belt body having upper, lower, and opposite side borders, and in conjunction therewith, the following:

- at least one side border fastener system with respect to the first and/or second sling(s) in combination, configured to secure corresponding opposite side borders of the first and second slings in conjunction or registry such that the pelvic belt bodies of the first and second patient slings can be girded about the pelvis area of the patient and fixed with respect to a horizontal orientation;
- at least one suspension strap (shoulder strap(s)) with respect to the first and/or second sling(s) in combination; and
- at least one depending leg strap with respect to the first and/or second sling(s) in combination, terminating in leg strap fastener system(s) configured to secure the leg strap(s) of the first and/or second sling(s) respectively to the pelvic belt body(ies) of the second and/or first patient sling(s);

wherein at least one of the at least one depending leg strap is encircled with a walled elongate tube that is double open ended, and made with a reduced friction sheet material.

2. The ambulation and mobility harness of claim 1, wherein at least one of the at least one depending leg strap is padded with a resilient cushioning tube; and the resilient cushioning tube of the at least one of the at least one depending leg strap is encircled with a walled, elongate tube that is double open ended, and made with a reduced friction sheet material.

3. The ambulation and mobility harness of claim 2, wherein there are at least two depending leg straps, and each is padded with a resilient cushioning tube encircled with a walled, elongate tube that is open ended, and made with reduced friction sheet material.

4. The ambulation and mobility harness of claim 1, wherein the first patient sling comprises a first patient mobility garment for nurses, and the second patient sling comprises a second patient mobility garment for nurses, wherein each of said first and second patient mobility garments for nurses comprises the generally flexible, laterally extending pelvic belt body, which is flexible and has the upper, lower, and opposite side borders, and wherein:

- a plurality of spaced apart structural reinforcement members (ribs) placed in generally vertical directions that substantially approach or span the upper and lower borders are present; and a plurality of loops vertically positioned with respect to one another about the ribs are present;
- the least one side border fastener system includes a plurality of flexible, adjustable length girding straps horizontally oriented with respect to the pelvic belt body and configured to gird the pelvic belt body about the pelvis area of the patient and bring the opposite side borders into conjunction or registry, each girding strap having a girding strap attaching member for fixation thereof;
- the at least one suspension strap (shoulder strap(s)) includes a plurality of flexible, adjustable length suspension straps (shoulder straps); and
- the at least one depending leg strap includes a plurality of flexible, depending leg straps terminating in a fastening contrivance for engaging at least one of the vertically positioned loops;

wherein the first patient mobility garment for nurses is connected to the second patient mobility garment for nurses, as follows:

- by connection of at least two of the terminating fastening contrivances of at least two of the plurality of flexible depending leg straps of the first patient mobility garment for nurses to at least two of the vertically positioned loops of the second patient mobility garment to provide a first ambulation harness leg strap, and by connection of at least two of the terminating fastening contrivances of at least two of the plurality of flexible depending leg straps of the second patient mobility garment for nurses to at least two of the vertically positioned loops of the first patient mobility garment to provide a second ambulation harness leg strap; and by connection of at least one of the plurality of flexible, adjustable length girding straps of the first patient mobility garment for nurses by at least part of its girding strap attaching member to at least one of the plurality of flexible, adjustable length girding straps of the second patient mobility garment for nurses by at least part of its corresponding girding strap attaching member, and by connection of at least one of the plurality of flexible, adjustable length girding straps of the second patient mobility garment for nurses by at least part of its girding strap attaching member to at least one of the plurality of flexible, adjustable length girding straps of the first patient mobility garment for nurses by at least part of its corresponding girding strap attaching member.

5. The ambulation and mobility harness of claim 4, wherein each flexible, depending leg strap is padded with a resilient cushioning tube.

6. The ambulation and mobility harness of claim 5, wherein each resilient cushioning tube is encircled with a walled, elongate tube that is double open ended, and made with a reduced friction sheet material.

7. The ambulation and mobility harness of claim 6, wherein the walled, elongate tube is double walled.

8. The ambulation and mobility harness of claim 4, wherein each flexible, depending leg strap is encircled with a walled elongate tube that is double open ended, and made with a reduced friction sheet material.

9. A friction-reducing tube device, which comprises, in combination, the following:

a resilient, flexible cushioning tube having outer and inner surfaces; and a walled, elongate tube that is made with a resilient, flexible reduced friction sheet material, which at least part of encircles at least part of the outer surfaces of the resilient, flexible cushioning tube;

wherein the device is double open ended, with each of its open ends in communication with the other to make an end-to-end penetratable volume, and—when employed to surround a weight-bearing strap or other suitable feature of ambulation and mobility harness equipment, or of a garment or sling for assisting in patient mobility, and put in contact with and under force from a patient's body part—is configured to achieve the following:

in a first position run along a linear axis within the end-to-end penetratable volume and in a second position reversibly flex away from the linear axis such that the device can substantially conform to the patient's body part; and reduce friction with the patient's body part, in comparison to the strap or other suitable feature not having the friction-reducing tube device.

10. The device of claim 9, which is mounted on to surround the strap or other suitable feature, which includes a strap of ambulation and mobility harness equipment, or of a garment or sling for assisting in patient mobility.

11. The device of claim 10, wherein the strap of ambulation and mobility harness equipment, or of a garment or sling for assisting in patient mobility is a leg strap.

12. The device of claim 11, wherein the ambulation and mobility harness equipment, or of a garment or sling for assisting in patient mobility comprises the ambulation and mobility harness for a patient, which comprises, in combination, a first patient sling and a second patient sling, each of said first and second patient slings comprising a generally flexible, laterally extending pelvic belt body having upper, lower, and opposite side borders; the resilient cushioning tube is made from a suitable foamed plastic or resin material; and the reduced friction sheet material is made with a low friction, low shear plastic.

13. The device of claim 12, wherein the resilient cushioning tube is made with an elastomeric closed cell pipe insulation tubing having microbial protection, and is waterproof and washable or otherwise disposable; and the reduced friction sheet material is made with a nylon and/or a polyurethane, infused and/or coated with a silicone or other silicon containing compound or composition, and is disposable.

14. The device of claim 9, wherein the walled, elongate tube is plural walled and folded such that at least one of its walls lines at least part of the outer surfaces of, and at least one of its walls lines at least part of the inner surfaces of, the resilient, flexible cushioning tube.

15. The device of claim 14, wherein the resilient cushioning tube is made with a closed cell foam and is waterproof and washable or otherwise disposable; and the reduced friction sheet material is made with a low friction, low shear plastic, and is disposable.

16. The ambulation and mobility harness of claim 15, wherein the first patient sling comprises a first patient mobility garment for nurses, and the second patient sling comprises a second patient mobility garment for nurses, wherein each of said first and second patient mobility garments for nurses comprises the generally flexible, laterally extending pelvic belt body, which is flexible and has the upper, lower, and opposite side borders, and wherein:

a plurality of spaced apart structural reinforcement members (ribs) placed in generally vertical directions that substantially approach or span the upper and lower borders are present; and a plurality of loops vertically positioned with respect to one another about the ribs are present;

the least one side border fastener system includes a plurality of flexible, adjustable length girding straps horizontally oriented with respect to the pelvic belt body and configured to gird the pelvic belt body about the pelvis area of the patient and bring the opposite side borders into conjunction or registry, each girding strap having a girding strap attaching member for fixation thereof;

the at least one suspension strap (shoulder strap(s)) includes a plurality of flexible, adjustable length suspension straps (shoulder straps); and the at least one depending leg strap includes a plurality of flexible, depending leg straps terminating in a fastening contrivance for engaging at least one of the vertically positioned loops;

wherein the first patient mobility garment for nurses is connected to the second patient mobility garment for nurses, as follows:

by connection of at least two of the terminating fastening contrivances of at least two of the plurality of flexible depending leg straps of the first patient mobility garment for nurses to at least two of the vertically positioned loops of the second patient mobility garment to provide a first ambulation harness leg strap, and by connection of at least two of the terminating fastening contrivances of at least two of the plurality of flexible depending leg straps of the second patient mobility garment for nurses to at least two of the vertically positioned loops of the first patient mobility garment to provide a second ambulation harness leg strap; and by connection of at least one of the plurality of flexible, adjustable length girding straps of the first patient mobility garment for nurses by at least part of its girding strap attaching member to at least one of the plurality of flexible, adjustable length girding straps of the second patient mobility garment for nurses by at least part of its corresponding girding strap attaching member, and by connection of at least one of the plurality of flexible, adjustable length girding straps of the second patient mobility garment for nurses by at least part of its girding strap attaching member to at least one of the plurality of flexible, adjustable length girding straps of the first patient mobility garment for nurses by at least part of its corresponding girding strap attaching member.

17. The ambulation and mobility harness of claim 16, wherein at least one of the at least one depending leg strap is padded with a resilient cushioning tube.

18. The ambulation and mobility harness of claim 17, wherein each flexible, depending leg strap is padded with a resilient cushioning tube.

19. An ambulation and mobility harness for a patient comprising, in combination, a first patient sling and a second patient sling, each of said first and second patient slings comprising a generally flexible, laterally extending pelvic belt body having an inner facing body portion and an outer facing body portion bounded by upper, lower, and opposite side borders, with the upper and lower borders spaced apart a substantial distance the opposite side borders spaced apart a substantial distance greater than the spacing apart of the upper and lower borders; and in conjunction therewith, the following:

at least one side border fastener system with respect to the first and/or second sling(s) in combination, configured to secure corresponding opposite side borders of the first and second slings in conjunction or registry such that the pelvic belt bodies of the first and second patient slings can be girded about the pelvis area of the patient and fixed with respect to a horizontal orientation;

at least one suspension strap (shoulder strap(s)) with respect to the first and/or second sling(s) in combination; and at least one depending leg strap with respect to the first and/or second sling(s) in combination, terminating in leg strap fastener system(s) configured to secure the leg strap(s) of the first and/or second sling(s) respectively to the pelvic belt body (ies) of the second and/or first patient sling(s);

such that, when the first and second patient slings are combined and girded about the patient and fixed with respect to the horizontal orientation, said inner facing body portions of said first and second patient slings face inwardly with respect to the patient, and said outer facing body portions of said first and second patient slings face outwardly with respect to the patient; and said generally flexible, laterally extending pelvic belt body as a unit only girds and encircles the patient once, and horizontally, substantially about the patient's pelvic area.

20. The ambulation and mobility harness of claim 19, wherein at least one of the at least one depending leg strap is padded with a resilient cushioning tube.

* * * * *